US008826410B2

(12) United States Patent  (10) Patent No.: US 8,826,410 B2
Sperling et al.  (45) Date of Patent: Sep. 2, 2014

(54) DEVICE API FOR SECURELY MONITORING AND MANAGING MOBILE BROADBAND DEVICES

(75) Inventors: David Sperling, Laguna Niguel, CA (US); Kevin Warmerdam, Encinitas, CA (US); Dzung Tran, Purcellville, VA (US); Christopher Heistad, Reinbeck, IA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 26 days.

(21) Appl. No.: 13/341,417

(22) Filed: Dec. 30, 2011

(65) Prior Publication Data
US 2012/0174208 A1   Jul. 5, 2012

Related U.S. Application Data

(60) Provisional application No. 61/430,087, filed on Jan. 5, 2011.

(51) Int. Cl.
*H04L 9/32* (2006.01)
*H04W 12/06* (2009.01)
*H04L 29/06* (2006.01)

(52) U.S. Cl.
CPC ........... *H04W 12/06* (2013.01); *H04L 63/0823* (2013.01); *H04L 63/0869* (2013.01)
USPC ................. 726/10; 726/2; 713/168; 713/169; 713/176; 380/270

(58) Field of Classification Search
CPC  H04L 63/0823; H04L 63/0869; H04W 12/06
USPC .......... 726/10, 2; 713/176, 168, 169; 380/270
See application file for complete search history.

(56) References Cited

U.S. PATENT DOCUMENTS

| 6,671,804 | B1* | 12/2003 | Kent .............................. 713/175 |
| 7,565,688 | B2* | 7/2009 | Hall et al. ......................... 726/5 |
| 7,743,408 | B2* | 6/2010 | Aboba et al. ...................... 726/4 |
| 2004/0198220 | A1* | 10/2004 | Whelan et al. ............... 455/41.1 |
| 2009/0016529 | A1* | 1/2009 | Gopinath et al. ............. 380/270 |
| 2009/0070436 | A1 | 3/2009 | Dawes | |
| 2009/0288138 | A1* | 11/2009 | Kalofonos ........................ 726/2 |
| 2011/0035595 | A1* | 2/2011 | Bartram et al. ............... 713/175 |

OTHER PUBLICATIONS

Cisco Systems Inc., "Cisco Small Business Pro WRP400", 2009, pp. 143-146.
Warwick Ford, "Advances in Public-Key Certificate Standards", ACM Sigsac Review—Special Issues 94 Workshop on Public Key Cryptography, vol. 13, No. 3 Jul. 1995.

* cited by examiner

*Primary Examiner* — Kambiz Zand
*Assistant Examiner* — Tongoc Tran
(74) *Attorney, Agent, or Firm* — Farjami & Farjami LLP

(57) ABSTRACT

There is provided a device application programming interface (API) for securely monitoring and managing mobile broadband devices. There is provided a client device with a processor configured to detect, using an API, the WWAN device, wherein the WWAN device conforms to the API, to perform a mutual authentication with the WWAN device by using a digital certificate of the WWAN device and a client digital certificate of the client device, to establish a secure connection with the WWAN device upon a successful authentication of the mutual authentication with the WWAN device. Moreover, the processor may be configured to issue, using the API, various commands to the WWAN device to monitor and manage the WWAN device.

20 Claims, 4 Drawing Sheets

DEVICE API FOR SECURELY MONITORING AND MANAGING MOBILE BROADBAND DEVICES

RELATED APPLICATIONS

This application claims priority of U.S. Provisional Application No. 61/430,087 filed on Jan. 5, 2011, which is hereby incorporated by reference in its entirety.

BACKGROUND

Internet connectivity enables access to social networking, personal finances, entertainment, news, shopping, and other essential goods, services, and information. With the proliferation of mobile devices such as smartphones, tablet computers, laptop computers, and other devices, there is a corresponding need to provide Internet connectivity to these mobile devices.

Currently, there is a diverse ecosystem of wireless broadband devices to provide Internet connectivity, including integrated and external mobile broadband cards, USB modems, mobile hotspot devices, wireless routers, broadband modems, and others. Generally, such wireless broadband devices may provide WWAN (wireless wide area network) Internet access through a WLAN (wireless local area network) hotspot. However, it is difficult to monitor and manage client devices connected to such wireless broadband devices, as there is no standardized management interface amongst the various device manufacturers. Moreover, because of the various wireless broadband device form factors, several different communication interfaces may be utilized for providing access to management interfaces, with many communication interfaces providing limited security features.

SUMMARY

The present disclosure is directed to a device application programming interface (API) for securely monitoring and managing mobile broadband devices, substantially as shown in and/or described in connection with at least one of the figures, as set forth more completely in the claims.

DETAILED DESCRIPTION

Figure 1:
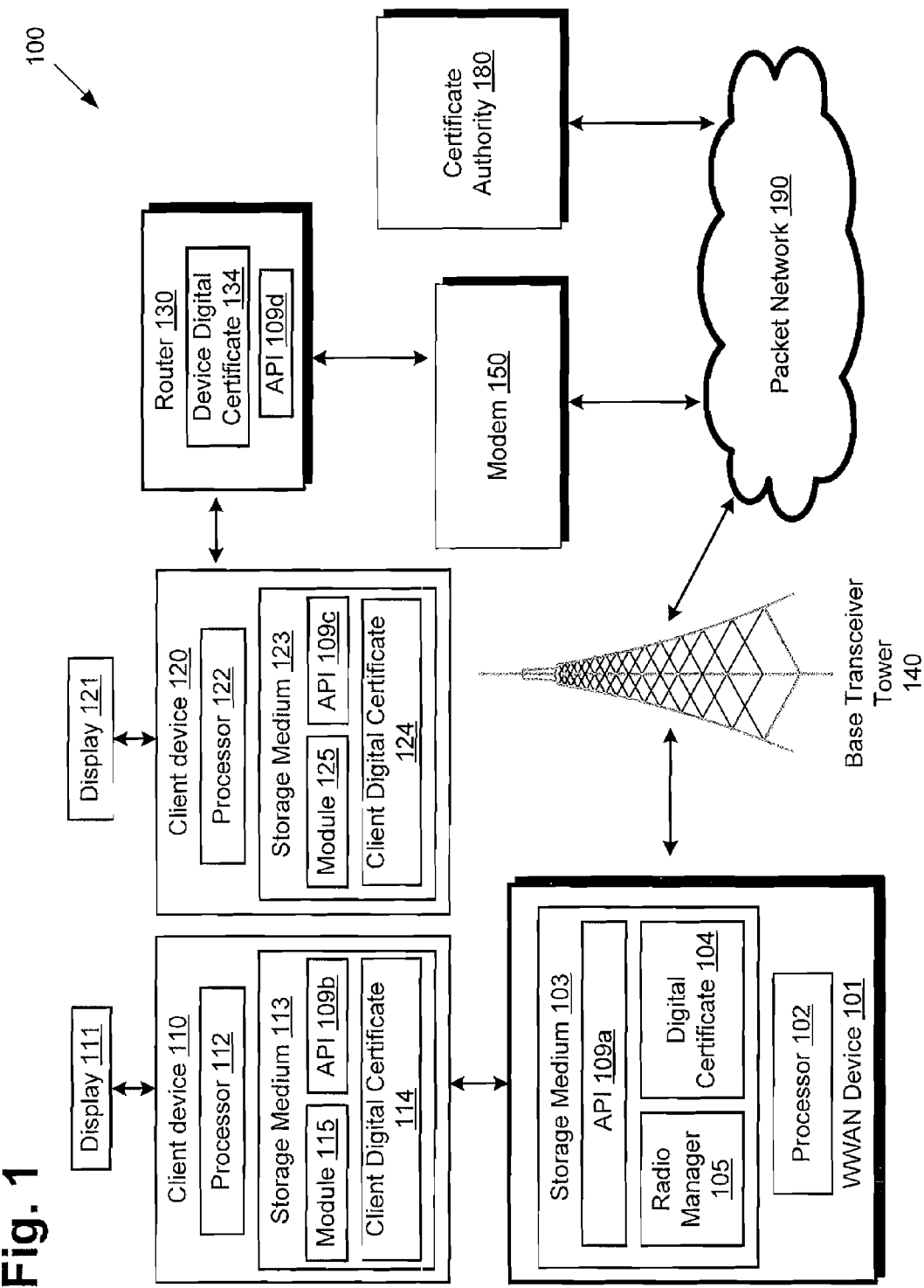
FIG. 1 presents an exemplary diagram of a system for monitoring and managing a plurality of devices by using a WWAN device API.

The following description contains specific information pertaining implementations in the present disclosure. One skilled in the art will recognize that the present application may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an exemplary diagram of a system for monitoring and managing a plurality of client devices by using a WWAN device API. System 100 includes WWAN device 101, client devices 110 and 120, displays 111 and 121, router 130, base transceiver tower 140, modem 150, certificate authority 180, and packet network 190. WWAN device 101 includes processor 102 and storage medium 103. Storage medium 103 includes digital certificate 104, radio manager 105, and API 109a. Client device 110 includes processor 112 and storage medium 113. Digital certificate 104 is a device digital certificate. Storage medium 113 includes client digital certificate 114, module 115, and API 109b. Client device 120 includes processor 122 and storage medium 123. Storage medium 123 includes client digital certificate 124, module 125, and API 109c. Router 130 includes device digital certificate 134 and API 109d.

Each of processors 102, 112, and 122 may be any type of processor such as a central processing unit, for example. Each of storage mediums 103, 113, and 123 may be any type of non-volatile memory device such as a hard drive with many gigabytes of memory. Each of APIs 109a, 109b, 109c, and 109d may be the same API. In an alternate embodiment, APIs 109a, 109b, 109c, and 109d may be modified based upon the device the API resides upon or the associated functionality of the device. Each of digital certificates 104, 114, 124, and 134 may be a digital certificate containing information used for authentications and secure connections between devices implemented according to the same or similar APIs, such as APIs 109a, 109b, 109c, or 109d. Each of displays 111 and 121 may be any type of display monitor such as a touch sensitive liquid crystal display (LCD) monitor. Displays 111 and 121 may be operatively connected to client devices 110 and 120, respectively, and may serve as input devices. In other implementations, likewise displays 111 and 121 may be integrated into client devices 110 and 120, respectively. In yet other implementations, other input devices may be operatively connected to or integrated with client devices 110 and 120. Radio manager 105 may be any software client implemented according to API 109a. Radio manager 105 may be executed by processor 102 to control all functionalities of WWAN device 101. Modules 115 and 125 may be software clients implemented according to APIs 109b and 109c, respectively. Processors 112 and 122 may execute modules 115 and 125, respectively, to control the functionalities of client devices 110 and 120, respectively.

In one implementation of the present application as shown in FIG. 1, WWAN device 101 may be any wireless hotspot device such as a Wi-Fi hotspot, for example. In alternative implementations, WWAN device 101 can be a USB modem, cellphone, smartphone, tablet personal computer (PC), or any other mobile device capable of functioning as an access point or WWAN connection device. In FIG. 1, WWAN device 101 is not connected to a display, since WWAN device 101 can be a dedicated mobile hotspot or WWAN connection device. In alternative implementations, WWAN device 101 may also be operatively connected to an input device or be integrated with an input device. In those instances, WWAN device 101 can be a smartphone, for example. Client devices 110 and 120 may be any type of mobile device capable of communicating and connecting to WWAN device 101.

Base transceiver tower 140 may be any type of tower equipped with transceiver hardware that allows for the exchange of digital data between WWAN device 101 and packet network 190. Packet network 190 may be a public network, such as the Internet. Modem 150 can be any type of modem, such as an Asymmetric Digital Subscriber Line (ADSL) modem, for example. Modem 150 may allow data to be exchanged between router 130 and packet network 190. Certificate authority 180 can be an entity that assigns digital certificates, including digital certificates 104, 114, 124 and 134 to WWAN device 101, client devices 110 and 120, and router 130, respectively. While all connections in FIG. 1 are wireless connections, in other implementations, some or all of the connections may be physical connections as well.

APIs 109a, 109b, 109c, and 109d and digital certificates 104, 114, 124, and 134 may allow the mobile devices to securely connect and communicate with each other. APIs 109a, 109b, 109c, and 109d facilitate the managing and monitoring of WWAN device 101 or router 130 by client devices 110 and 120. Digital certificates 104, 114, 124, and 134 can be used to ensure proper mutual authentication between mobile devices attempting to establish connections. In one implementation, processor 102 of WWAN device 101 is configured to detect, using API 109a, client device 110, wherein client device 110 conforms to API 109b, as shown in FIG. 1. WWAN device 101 and client device 110 can be equipped with detection capabilities for discovering other devices conforming to the same or similar API, including APIs 109a, 109b, 109c, and 109d. While the wireless frequencies used to establish a connection between WWAN device 101 and client device 110 in FIG. 1 may be Wi-Fi frequencies, in other implementations the frequencies may be Bluetooth frequencies, Zigbee frequencies, or any other types of appropriate frequencies. Of course, in other implementations, the devices may be connected through physical connections, such as USB, for example.

After detecting client device 110, processor 102 may be configured to perform a mutual authentication with client device through a mutual exchange of digital certificates 104 and 114 with client device 110. In one implementation, the mutual authentication may be performed in a series of steps similar to the steps of the Transport Layer Security (TLS) process, as known in the art. Thus, communications using API 109a, 109b, 109c and 109d may be secured using TLS 1.2 or a similar technique or process. In alternative implementations, other mutual authentication processes may also be followed. To enforce mutual authentication, WWAN device 101 and client device 110 may each be required to authenticate the other device's digital certificate before connecting. Further, additional authentication steps may be utilized for increased security. The mutual authentication process is further described below in conjunction with FIG. 2.

Moving on, processor 102 may be further configured to establish a secure connection with client device 110 upon a successful performance of the mutual authentication with client device 110. Once the mutual authentication has been successfully performed, a secure connection between WWAN device 101 and client device 110 may be established to allow for further communication between the two devices through API calls. The secure connection allows WWAN device 101 to securely monitor and manage client device 110 and conversely upon authentication enable the client device to manage and issue commands to the WWAN device 110. Processor 112 may be further configured to issue, using the API, a plurality of commands to WWAN device 101. The issuing of a command can include transmitting that command using Hypertext Transfer Protocol (HTTP) or Hypertext Transfer Protocol Secure (HTTPS) to WWAN device 101. In other implementations, different information exchange protocols may be used. The actual command may be one of any commands defined by API 109b. WWAN device 101, upon receiving and recognizing the issued command, may send a secure response to client device 110 using API 109a.

The command, for example, can be a request for feature information of WWAN device 101. Feature information can include manufacturer information, model information, firmware information, hardware information, or any other information regarding the hardware or software components of WWAN device 101. Thus, after receiving a feature information request, WWAN device 101 may issue a secure response containing the appropriate information to client device 110. The command may also request other types of information from WWAN device 110 such as the properties of the WWAN connection with tower 140 and packet network 190, or information regarding other wireless connections that WWAN device 101 may support. API 109a and 109b may further require the secure responses to be formatted in Javascript Object Notation (JSON). Accordingly, WWAN device 101 may format the secure response in JSON.

Processor 102 may be further configured to execute an instruction in response to receiving an authentication request from client device 110. For example, WWAN device 101 may issue one or more commands to determine the WWAN chipset of WWAN device 101. WWAN device 101, upon receiving the response, may halt communication with client device 110 if the WWAN chipset does not match the properties of digital certificate 104.

In other instances, WWAN device 101, using API 109a, may even inform client device 110 through unsolicited notifications regarding important events on WWAN device 101. For example, to enforce bandwidth caps or quotas, client device 110 may be allocated only a certain amount of data transfer, after which WWAN device 101 may take corrective actions such as speed limiting or disconnection. In other circumstances, client device 110 may also apply security policy with regards to WWAN device 101.

Accordingly, APIs 109a and 109b may provide a consistent interface between WWAN device 101 and client device 110 within a wireless network such as a wireless local area network (WLAN), thereby allowing WWAN device 101 to be easily and securely monitored and managed by client 110. Devices with wired data connections, such as USB connections, may also be supported. Moreover, because API 109a and 109b may be implemented uniformly across different device form factors and device manufacturers, secure network management can be provided regardless of the specific device or vendor of such devices.

Client device 120 and router 130 are similarly connected through a consistent communication interface created by API 109c and 109d. As will be explained in FIG. 2, the extension sections of digital certificates 104, 114, 124, and 134 may be used for narrowing or restricting communication between mobile devices implemented with the same or similar API. Moreover, in other implementations, system 100 can be any number of mobile devices conforming to the same or similar API and loaded with various digital certificates. The mobile devices may be capable of connecting to an access point or becoming an access point.

While only client device 110 is shown as connected to WWAN device 101 in FIG. 1, in alternative implementations, any number of client devices may be connected to WWAN device 101 through wireless signals or physical connections. Likewise, in other implementations, any number of client devices may be connected to router 130 through wireless frequencies or physical connections.

Figure 2:
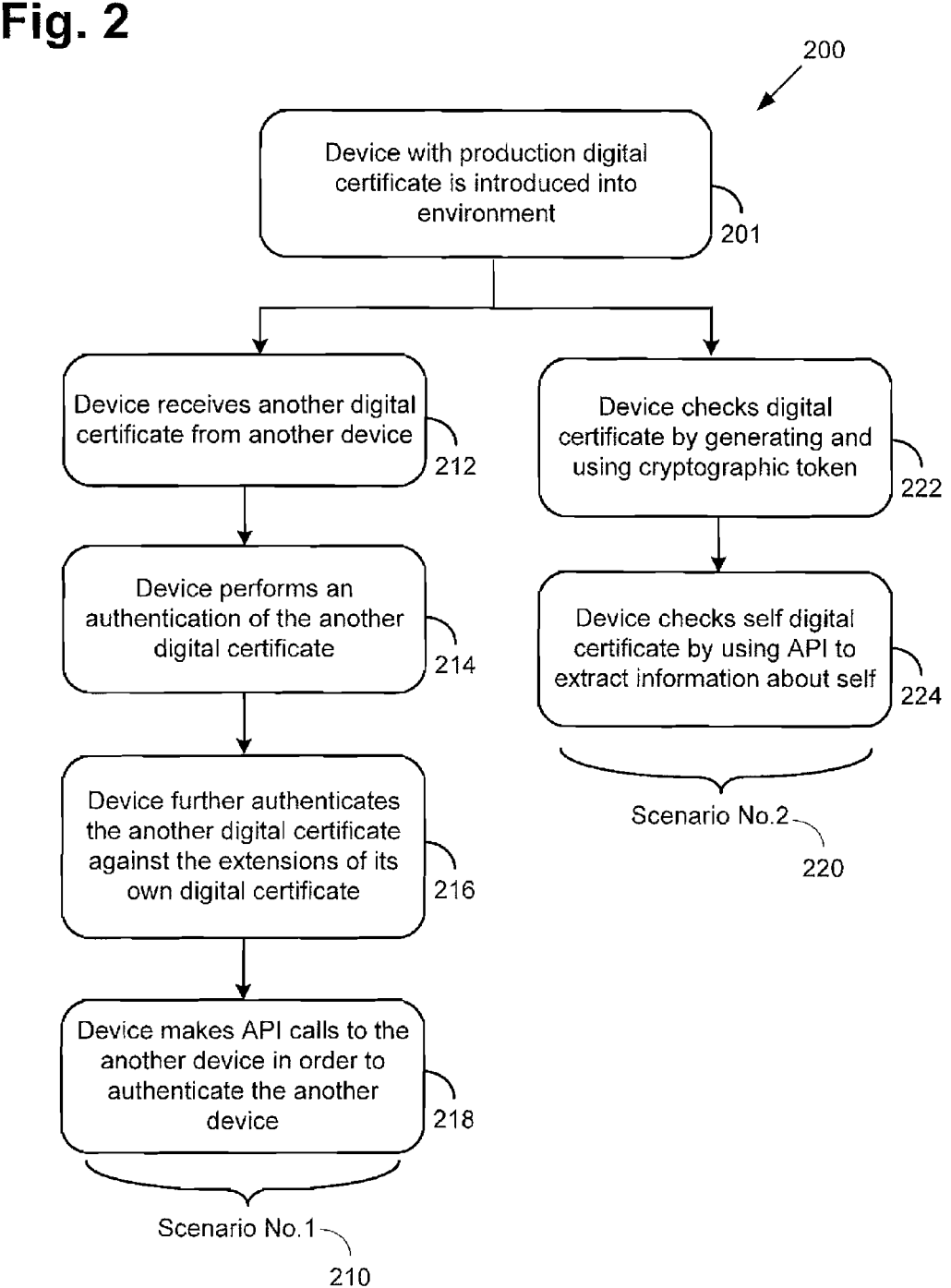
FIG. 2 presents a block diagram illustrating exemplary scenarios in which digital certificates may be used by a WWAN device API to authenticate devices during connections or self-authentications.

FIG. 2 presents a block diagram illustrating exemplary scenarios in which digital certificates may be used by a WWAN device API to authenticate devices during connections or self-authentications. FIG. 2 includes scenarios 210 and 220. Scenario 210 includes events 212, 214, 216, and 218, and scenario 220 includes events 222 and 224. Event 201 may be an initial event common to both scenario 210 and 220. Event 201 may occur when WWAN device 101 with digital certificate 104 is introduced into system 100 of FIG. 1. Loaded with digital certificate 104, WWAN device 101 may communicate with other devices conforming to API 109a. In other instances, digital certificate 104 may be configured in such a way that it may limit the types of devices WWAN device 101 may communicate with, regardless of conformity to API 109a.

Scenario 210 may pertain to a situation in which a device, such as WWAN device 101, is performing a mutual authentication with another mobile device, such as client device 110, to establish a secure connection, During event 212, WWAN device 101 and client device 110 may engage in a mutual exchange of digital certificates 104 and 114. During the digital certificate exchange, WWAN device 101 may acquire a copy of client digital certificate 114 and client device 110 may acquire a copy of digital certificate 104 associated with WWAN device 101.

In event 214, processor 102 may be configured to perform an authentication of client digital certificate 114 such as checking the expiration date of client digital certificate 114 and validating the digital signature of certificate authority 180 in order to ensure that client digital certificate 114 is currently valid. In other implementations, additional information contained within client digital certificate 114 may also be validated. Client device 110 may also perform similar actions to authenticate the contents of digital certificate 104. In an embodiment, the validating of the digital signature of certificate authority 180 is performed with a file stored on storage medium 103 that contains a list of valid certificate authorities.

In event 216, client digital certificate 114 is authenticated against one or more extensions within an extension section of digital certificate 104. The contents of digital certificate 104 may be ordered into a format similar to ITU Telecommunication Standardization Sector (ITU-T), as exemplified by the X.509 digital certificate, as known in the art. Digital certificate 104 can include one or more extensions in an extension section. The extensions within the extension section can, for example, include constraints on the usage of WWAN device 101. The constraints on the usage may include limiting functions of API 109a or limiting connections with or functionality associated with other devices based upon a wireless operator, chipset manufacturer, compatible network/networks, WWAN device original equipment manufacturer ("OEM"), WWAN device model name, WWAN device revision, client device OEM, client device operating system, client device form factor, an independent software vendor, or other criteria. In alternative implementations, additional types of limitations or functionality may be included in the extension section. Certificate authority 180 may set the extensions within the extension section.

Each extension within the extension section of digital certificate 104 may further include a critical bit that may be set to a critical or a non-critical value. The critical bits may narrow the extensions validated within digital certificate 104. For example, one extension within digital certificate 104 may allow WWAN device 101 to communicate with smartphones only. Thus, if client device 110 is a tablet PC, then the extension is violated and mutual authentication will fail if the client device extension is marked critical. If the critical bit for the smartphones only extension is set to a critical value, then the extension must be considered as a permanent limitation that is irrevocable. On the other hand, if the smartphones only extension has a critical bit set to a non-critical value, then client device 110 will not consider the extension while validating WWAN device 101. In the future or in addition, another certificate may exist which contains the critical attribute set for the extension and in this case it MUST be considered during validation. The usage of critical/non-critical attributes allows the validation rules to vary independently from release to release and also between system pairings while still maintaining a robust validation system.

In other implementations, digital certificate 104 may include extensions narrowing the types of devices that may be authenticated based on independent software vendors and/or specific OEMs, as well. If the information within client digital certificate 114 satisfies all of the extensions set to critical values in digital certificate 104, then a successful mutual authentication is possible; otherwise, an authentication failure should occur. Once WWAN device 101 successfully authenticates client digital certificate 114 against the extensions of digital certificate 104 and client device 110 successfully authenticates digital certificate 104 against client digital certificate 114, then mutual authentication is completed.

Continuing with the present example, in event 218, client device 110 may make API calls to WWAN device 101 in order to validate WWAN device 101 against its own digital certificate 104 and the extensions of client digital certificate 114. As previously discussed, the API calls may include commands to retrieve information concerning WWAN device 101. Client device 110 may use the information to check against digital certificate 104 or against client digital certificate 114 in order to authenticate client device 110. WWAN device 101 may perform similar operations against client device 110 to recheck client digital certificate 114. Any discrepancies between the requested information and digital certificate 104 may result in a failed mutual authentication between WWAN device 101 and client device 110.

Moving to scenario 220, WWAN device 101 may engage in self-authentication rather than mutual authentication with another device. However, self-authentication may also occur during the mutual authentication of scenario 210. In event 222, WWAN device 101 may temporarily generate a cryptographic token by using data within digital certificate 104 and/or data acquired from certificate authority 180. The temporarily generated cryptographic token may be used to ensure that digital certificate 104 is authentic and valid for WWAN device 101. The cryptographic token may help in deterring a third-party from swapping digital certificate 104 with another digital certificate or tampering with digital certificate 104. The cryptographic token may be formed only temporarily during the self-authentication.

In event 224, WWAN device 101 may authenticate its own digital certificate 104 by using API 109a. WWAN device 101 may make internal calls via API 109a to extract information about itself and to compare such information against digital certificate 104. For example, digital certificate 104 can include specific identifiers and form factor information associated with WWAN device 101. WWAN device 101 may use API 109a to retrieve this information for authenticating against digital certificate 104. Accordingly, processor 102, prior to connecting with client device 110, may be configured to authenticate, using API 109a, WWAN device 101 against digital certificate 104, including the one or more extensions of digital certificate 104. In the situation that self-authentication fails, WWAN device 101 may prohibit itself from communicating with any other mobile devices implemented in accordance to API 109a.

In another embodiment, module 115 of client device 110 may authenticate its own client digital certificate 114. Client digital certificate 114 may contain extensions that constrain the use of API 109b to specific client device operating system environments, such as Mac OSX, Linux, or Windows, or to only support certain client form factors such as tablets, laptops or smartphones. In this implementation, module 115 may make function calls within client device 110 to determine if the operating environment matches these extensions, and it they do not, may prohibit itself from communicating with other devices implemented in accordance to API 109b.

While each of scenarios 210 and 220 includes series of events, the events may not be required to occur in the order shown in FIG. 2. For example, in scenario 210, event 216 may occur before event 214 and the same results may be achieved. Furthermore, events 222 and 224 may also occur within scenario 210, during mutual authentication and prior to determining the success of the mutual authentication. Moreover, the extensions of any digital certificate may be updated, modified, or changed by a certificate authority, such as certificate authority 180 of FIG. 1.

Figure 3:
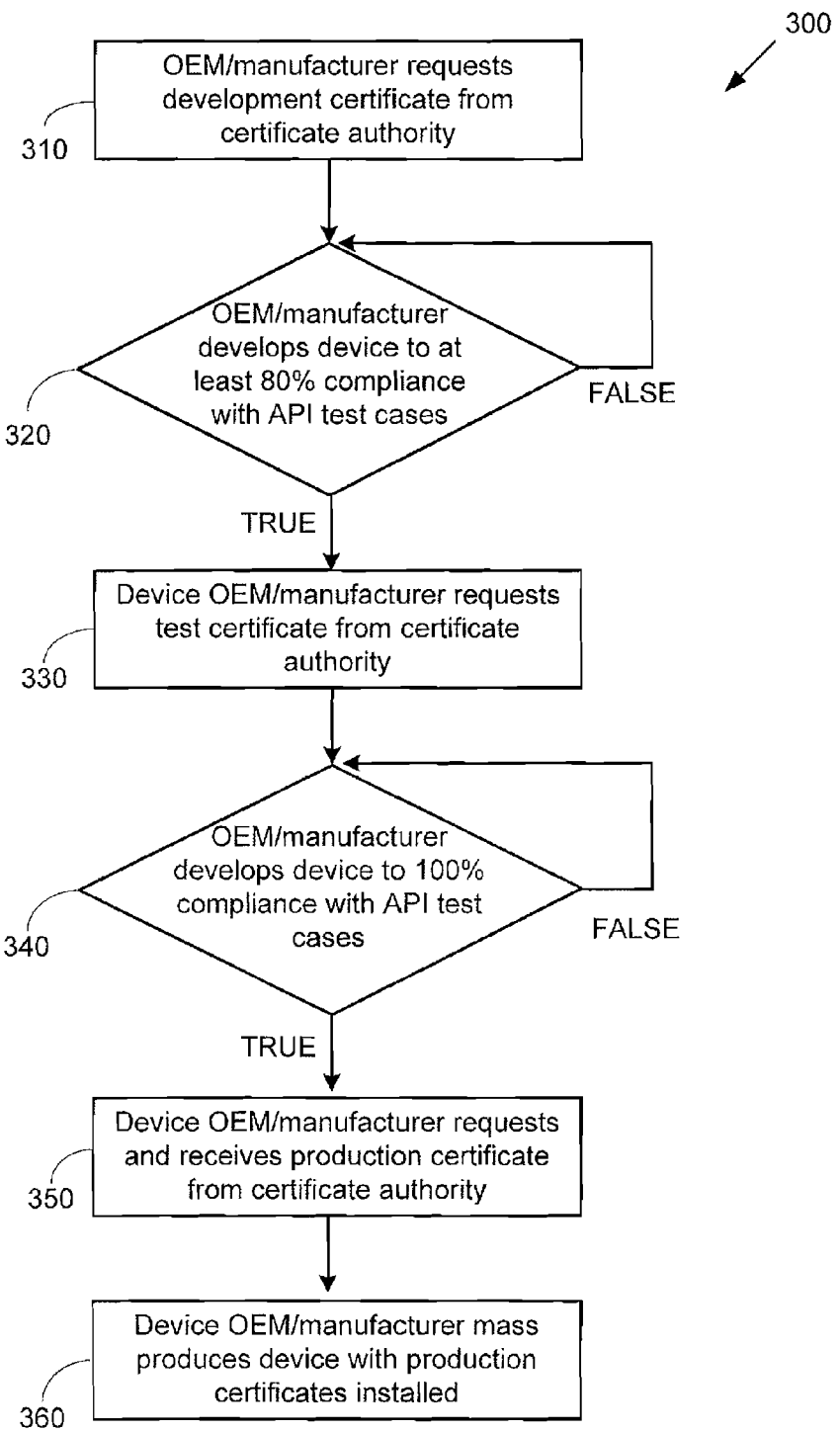
FIG. 3 presents a block diagram of an exemplary process for a mobile device manufacturer to receive a digital certificate used by the WWAN device API.

FIG. 3 presents a block diagram of an exemplary process for a mobile device to receive a digital certificate used by the WWAN device API. The process begins when an original equipment manufacturer (OEM) may request a development certificate from a certificate authority for a mobile device being developed by the OEM (310). For example, the OEM may be designing WWAN device 101 of FIG. 1 for future mass production. WWAN device 101 may initially include a development digital certificate. The development digital certificate allows WWAN device 101 to be used for testing purposes and cannot be introduced into an ecosystem to communicate with other devices implemented according to API 109a. Accordingly, the development digital certificate is not equivalent to digital certificate 104 of FIG. 1. The process continues as the OEM may develop WWAN device 101 to pass at least eighty percent (80%) of the API test cases issued by certificate authority 180 (320). Development may continue until WWAN device 101 complies with at least 80% of the API test cases or until the development digital certificate expires, which may generally be six months or set to any time period as desired. If the digital certificate expires, the OEM may request another development certificate.

By complying with at least 80% of the API test cases, the OEM may request and acquire a test digital certificate from certificate authority 180 (330). Continuing the process, OEM may further develop WWAN device 101 to conform to one hundred percent (100%) of the API test cases (340). The test digital certificate is generally valid for a period of 6 months and may be renewed after expiration.

Continuing forward, upon complying with 100% of the API test cases, the OEM may request and receive a production digital certificate from certificate authority 180 (350). This production digital certificate may correspond to digital certificate 104. Then WWAN device 101 along with digital certificate 104 may be mass-produced and distributed into the market (360). Generally, the same digital certificate 104 may be installed on the same model of WWAN device 101.

Figure 4:
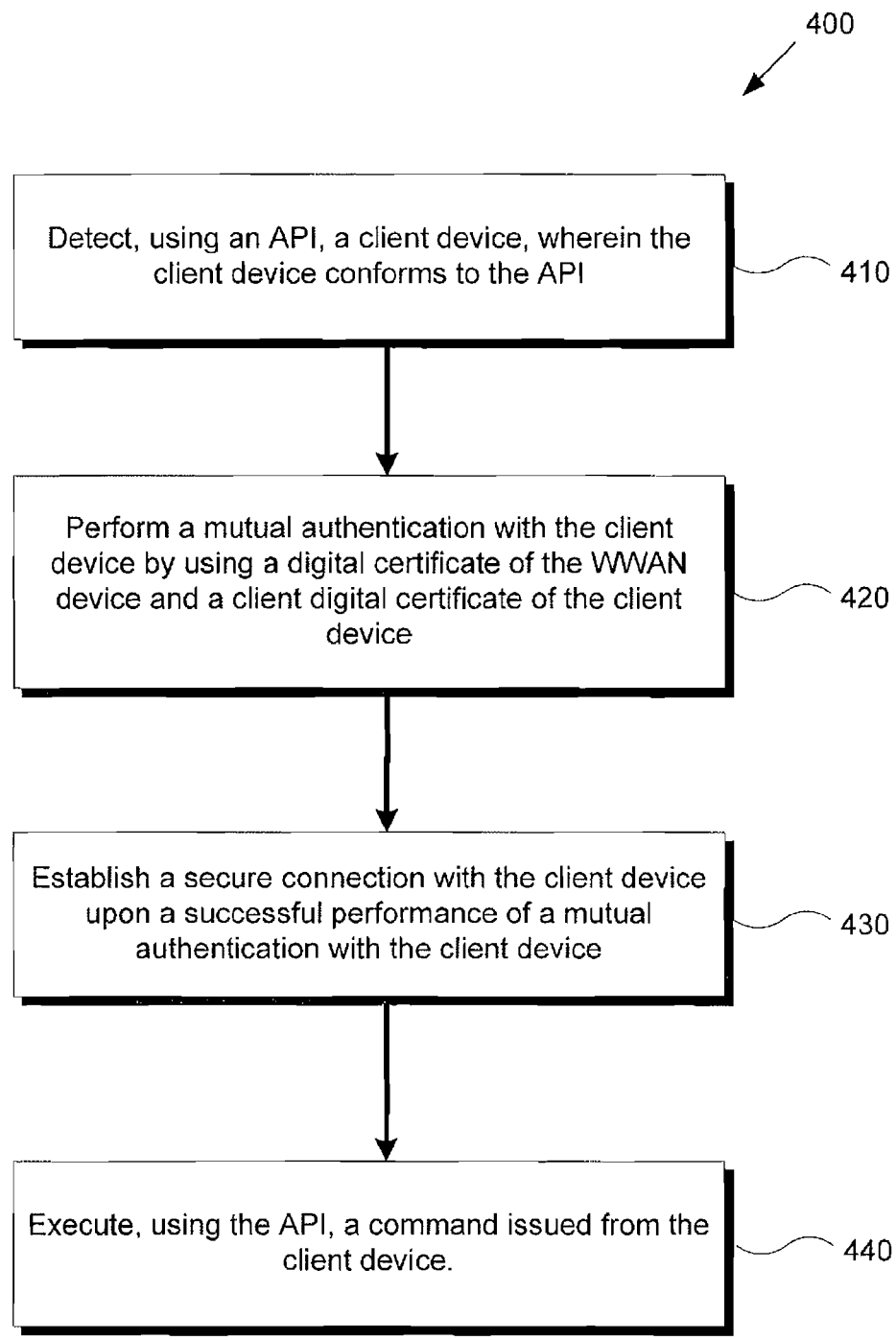
FIG. 4 presents an exemplary flowchart illustrating a method for monitoring and managing a device from a plurality of client devices by using a WWAN device API.

FIG. 4 presents an exemplary flowchart illustrating a method for monitoring and managing a WWAN device from one of a plurality of client devices by using a WWAN device API. Certain details and features have been left out of flowchart 400 that are apparent to a person of ordinary skill in the art. While flowchart 400 is sufficient describe one implementation of the present method, other implementations of flowchart 400 are possible.

Referring flowchart 400 in FIG. 4 and system 100 of FIG. 1, flowchart 400 beings with processor 102 of WWAN device 101 being configured to detect, using API 109a, client device 110, wherein client device 110 conforms to API 109a (410). As previously discussed, devices with APIs 109a, 109b, 109c, and 109d may be implemented with hardware and software components allowing those devices to detect the presence of each other. For example, when client device 110 is within Wi-Fi range of WWAN device 101, the devices may detect each other using Wi-Fi.

Referring to flowchart 400 in FIG. 4 and system 100 of FIG. 1, flowchart 400 continues as processor 102 is configured to perform a mutual authentication with client device 110 by using digital certificate 104 of WWAN device 101 and client digital certificate 114 of client device 110 (420). As previously discussed, WWAN device 101 and client device 110 may exchange digital certificates. WWAN device 101 may attempt to determine the authenticity of client digital certificate 114 and validate digital certificate 114 against the extensions of digital certificate 104. Client device 110 may perform similar operations on digital certificate 104 by authenticating digital certificate 104 and validating digital certificate 104 against the extensions of client digital certificate 114.

Continuing with flowchart 400 in FIG. 4 and system 100 of FIG. 1, the process continues with processor 102 of WWAN device 101 configured to establish a secure connection with client device 110 upon a successful authentication of the mutual authentication with client device 110 (440). As previously discussed, once there is a successful mutual authentication, WWAN device 101 may establish a secure connection with client device 110 in order for client device 110 to monitor and manage WWAN device 101 through one or more commands, which may include requests for information or actions that may affect the condition of WWAN device 101. For example, as previously discussed, bandwidth caps, time limits or data transfer limits may be enforced by speed limiting WWAN device 101 or by performing other actions.

Referring to flowchart 400 in FIG. 4 and system 100 of FIG. 1 flowchart 400 continues as processor 102 is configured to execute, using API 109a, a command issued from client device 110 (440). As previously described, API 109a and API 109b allows for a common interface protocol between WWAN device 101 and client device 110. Under the secure connection established from earlier in flowchart 400 (430), client device 110 may issue a series of commands to WWAN device 101 in order to monitor and manage WWAN device 101.

Thus, the present application discloses securely monitoring and managing wireless devices within a wireless network. To provide a consistent interface across all mobile broadband devices, manufacturers of hardware and software components for various mobile devices may target development in accordance to a shared API. Digital certificates may be stored within all mobile devices in order for the devices to perform mutual authentications and provide secure communications. Moreover, the extension sections of the digital certificates may limit or restrict the types of devices that may communicate with each other, thereby facilitating control over the manner in which the mobile devices may be used together. Accordingly, the APIs and digital certificates allow simple and secure managing and monitoring of wireless devices through a device API.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementation described herein, but many rearrangements, modifications, and substitutions are possible without departing from the present disclosure.

What is claimed is:

1. A wireless wide area network (WWAN) device comprising:
   a storage medium storing a WWAN API and a WWAN digital certificate; and
   a processor configured to:
      detect, using the WWAN API, the client device, wherein a client API of the client device conforms to the WWAN API;
      perform a mutual authentication with the client device using the WWAN digital certificate of the WWAN device and a client digital certificate received from the client device;
      establish a secure connection with the client device upon a successful performance of the mutual authentication with the client device; and
      execute, using the WWAN API, a command issued from the client device.

2. The WWAN device of claim 1, wherein the performing the mutual authentication comprises validating the client digital certificate against an extension of the WWAN digital certificate, wherein the extension comprises a constraint on usages of the WWAN device.

3. The WWAN device of claim 2, wherein the constraint on the usages includes limiting the WWAN device from communicating with one or more of the plurality of client devices based upon at least one of a wireless operator, chipset manufacturer, compatible networks, WWAN device OEM, WWAN device model name, WWAN device revision, client device OEM, client device operating system, client device form factor, and an independent software vendor.

4. The WWAN device of claim 1, wherein the processor, using the WWAN API, is further configured to send a secure response to the client device in response to the issuing of the command from the client device, wherein the secure response is in Javascript Object Notation format.

5. The WWAN device of claim 1, wherein the performing the mutual authentication comprises validating the client device against an extension of the WWAN digital certificate through one or more WWAN API calls to the client device, the WWAN API calls using transport layer security (TLS).

6. The WWAN device of claim 1, further comprising sending a response to the client device in response to the command, wherein the command and the response are transmitted using hypertext transfer protocol (HTTP) or hypertext transfer protocol secure (HTTPS).

7. The WWAN device of claim 1, wherein the WWAN device comprises a mobile broadband hotspot, USB modem, smartphone, a personal digital assistant, or a tablet computer.

8. A system comprising:
   a plurality of client devices comprising a first client device having a device storage medium storing a client API and a client digital certificate; and
   a wireless wide area network (WWAN) device comprising:
      a WWAN storage medium storing a WWAN API and a WWAN digital certificate; and
   a processor configured to:
      detect, using the WWAN API, the client device, wherein the client API conforms to the WWAN API;
      perform a mutual authentication with the client device by using a WWAN digital certificate of the WWAN device and a client digital certificate of the client device;
      establish a secure connection with the client device upon a successful performance of the mutual authentication with the client device; and
      execute, using the WWAN API, a command issued from the client device.

9. The system of claim 8, wherein the performing the mutual authentication comprises validating the client digital certificate against an extension of the WWAN digital certificate, wherein the extension comprises a constraint on usages of the WWAN device.

10. The system of claim 9, wherein the constraint on the usages includes limiting the WWAN device from communicating with one or more of the plurality of client devices based upon at least one of a wireless operator, chipset manufacturer, compatible networks, WWAN device OEM, WWAN device model name, WWAN device revision, client device OEM, client device operating system, client device form factor, and an independent software vendor.

11. The system of claim 8, wherein the processor, using the WWAN API, is further configured to send a secure response to the client device in response to the issuing of the command from the client device, wherein the secure response is in Javascript Object Notation format.

12. The system of claim 8, wherein the performing the mutual authentication comprises validating the client device against an extension of the WWAN digital certificate through one or more WWAN API calls to the client device, the WWAN API calls using transport layer security (TLS).

13. The system of claim 8, wherein the processor is further configured to send a response to the client device wherein the command and the response are transmitted using hypertext transfer protocol (HTTP) or hypertext transfer protocol secure (HTTPS).

14. A method for monitoring and managing a wireless wide area network (WWAN) device from a client device, the method comprising:
   detecting, using a client API of the client device, the WWAN device, wherein a WWAN API stored in the WWAN device conforms to the client API stored in the client device;
   performing a mutual authentication with the WWAN device using a WWAN digital certificate received from the WWAN device and a client digital certificate stored in the client device;
   establishing a secure connection with the WWAN device upon a successful performance of the mutual authentication with the WWAN device; and
   issuing, using the client API, a command to the WWAN device.

15. The method of claim 14, wherein the performing the mutual authentication comprises validating the client digital certificate against an extension of the WWAN digital certificate, wherein the extension creates a constraint on usages of the WWAN device.

16. The method of claim 15, wherein the constraint on the usages includes limiting the WWAN device from communicating with one or more of the plurality of client devices based upon at least one of a wireless operator, chipset manufacturer, compatible networks, WWAN device OEM, WWAN device model name, WWAN device revision, client device OEM, client device operating system, client device form factor, and an independent software vendor.

17. The method of claim 14, the method further comprising receiving a secure response from the WWAN device in response to the issuing of the command, wherein the secure response is formatted in Javascript Object Notation format.

18. The method of claim 14, wherein the performing the mutual authentication comprises validating the client device against an extension of the WWAN digital certificate through WWAN API calls to the client device, the WWAN API calls using transport layer security (TLS).

19. The method of claim 14, further comprising receiving a response from the WWAN device in response to the command, wherein the command and the response are transmitted using hypertext transfer protocol (HTTP) or hypertext transfer protocol secure (HTTPS).

20. The method of claim 14, wherein the WWAN device comprises a mobile broadband hotspot, USB modern, smartphone, a personal digital assistant, or a tablet computer.

* * * * *